United States Patent
Barberis et al.

(10) Patent No.: US 10,349,339 B2
(45) Date of Patent: Jul. 9, 2019

(54) MULTI-BAND CELLULAR NETWORK WITH CONTROL PLANE DECOUPLED FROM USER PLANE

(71) Applicant: TELECOM ITALIA S.p.A., Milan (IT)

(72) Inventors: Sergio Barberis, Turin (IT); Giorgio Calochira, Turin (IT); Flavio Muratore, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 2 days.

(21) Appl. No.: 15/531,766

(22) PCT Filed: Dec. 10, 2014

(86) PCT No.: PCT/EP2014/077147
§ 371 (c)(1),
(2) Date: May 31, 2017

(87) PCT Pub. No.: WO2016/091293
PCT Pub. Date: Jun. 16, 2016

(65) Prior Publication Data
US 2017/0265121 A1    Sep. 14, 2017

(51) Int. Cl.
*H04W 48/08*    (2009.01)
*H04W 72/04*    (2009.01)
*H04W 48/20*    (2009.01)
*H04W 72/08*    (2009.01)
*H04W 48/18*    (2009.01)
*H04W 64/00*    (2009.01)
*H04W 84/04*    (2009.01)
(Continued)

(52) U.S. Cl.
CPC ........... *H04W 48/08* (2013.01); *H04W 48/20* (2013.01); *H04W 72/0453* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2010/0061301 A1    3/2010 Antal et al.
2014/0269632 A1*   9/2014 Blankenship ......... H04W 76/15
                                                      370/329
(Continued)

FOREIGN PATENT DOCUMENTS

WO         2008/082352 A1      7/2008
WO   WO 2008/082352 A1  * 10/2008  ........... H04L 29/063

OTHER PUBLICATIONS

3GPP TSG-RAN WG2 Meeting #81bis, R2-131056, Apr. 15-19, 2013, Agenda 7.2, Nokia.*
(Continued)

*Primary Examiner* — Gbemileke J Onamuti
*Assistant Examiner* — Sanjay K Dewan
(74) *Attorney, Agent, or Firm* — Oblon, McClelland, Maier & Neustadt, L.L.P.

(57) ABSTRACT

A cellular network comprising one or more user transceiver stations located within a first coverage area and that are each configured to provide radio coverage over a corresponding second coverage area by exploiting a selected frequency band among a respective set of frequency bands. When a user equipment within one first coverage area of requests to exchange user traffic, the cellular network selects a group of candidate user transceiver stations located within the first coverage area based on the position of the user equipment within the first coverage area; select a group of candidate frequency bands among sets of frequency bands of the user transceiver stations located within said one first coverage area; and allow the user equipment to exchange user traffic with one or more selected user transceiver stations exploiting a selected frequency band.

15 Claims, 2 Drawing Sheets

(52) U.S. Cl.
CPC .......... *H04W 72/082* (2013.01); *H04W 48/18* (2013.01); *H04W 64/00* (2013.01); *H04W 84/042* (2013.01)

(58) Field of Classification Search
USPC ........................................................ 370/329
See application file for complete search history.

(56) References Cited

U.S. PATENT DOCUMENTS

2016/0270101 A1* 9/2016 Lee .................. H04W 72/0446
2018/0139724 A1* 5/2018 Loehr .................. H04W 72/02

OTHER PUBLICATIONS

International Search Report and Written Opinion dated Aug. 12, 2015, in PCT/EP2014/077147, filed Dec. 10, 2014.
"Mobility Statistics for Macro and Small Cell Dual-Connectivity Cases", Nokia Siemens Networks, 3GPP TSG-RAN WG2 Meeting #81 bis, R2-131056, Apr. 15-19, 2013, 7 pages, XP 050699231, retrieved from the Internet: http://www.3gpp.org/ftp/tsg_ran/WG2_RL2/TSGR2_81bis/Docs/.
"Connectivity Models for Small Cell Enhancement", LG Electronics Inc., 3GPP TSG-RAN WG2 #81, R2-130314, Jan. 28-Feb. 1, 2013, 8 pages, XP 050668059, retrieved from the Internet: http://www.3gpp.org/ftp/tsg_ran/WG2_RL2/TSGR2_81/docs/.

* cited by examiner

MULTI-BAND CELLULAR NETWORK WITH CONTROL PLANE DECOUPLED FROM USER PLANE

BACKGROUND OF THE INVENTION

Field of the Invention

The present invention generally relates to wireless communication networks, such as cellular networks.

Overview of the Related Art

Evolution of cellular networks has experimented a significant growth in terms of spread and performance, and inside 3GPP ("Third Generation Partnership Project") the specification of LTE ("Long Term Evolution")/LTE-Advanced has been defined.

The 3GPP LTE/LTE-Advanced standard is conceived for allowing data to be high-speed conveyed between a fixed-location transceiver base station or node (e.g., eNodeB) radiating radio waves over a respective coverage area (cell) and user equipment (e.g., user terminals, such as cellular phones) within the coverage area.

Presently, cellular networks are seeing an increase in terms of number of new users and data throughput requirements. The ever increasing availability of new advanced user equipment, such as smartphones and tablets, has made available to the end users a huge number of client applications, many of them causing a frequent transmission and reception of data.

This implies that cellular networks have to manage an ever increasing amount of signaling information. As it is known to those skilled in the art, with signaling information (or simply "signaling") it is intended the information exchanged among user equipment and nodes of the cellular networks to ensure that user equipment are correctly linked to the cellular network. Signaling information relates to the establishment, control and managing of the connection between a user equipment and the network, in contrast to user information, which corresponds to the actual content data exchanged between the user equipment and the network based on the specific type of service requested by the user equipment. The signaling information traffic increase is caused by several factors, such as for example the "always-on" IP-connectivity required by smartphones, tablets and generally modern mobile devices, the widespread availability of applications for mobile devices ("Apps") which require very frequent periodic updates, and the growth of machine-to-machine (M2M) devices.

As disclosed for example in Section 7.2, page 134 of "*Introduction to 3G mobile communications*" by Juha Korhonen, Artech House, $2^{nd}$ edition, 2003, a cellular network may be regarded as formed by two sections, referred to as control plane (briefly, "C-plane") and user plane (briefly, "U-plane"). The C-plane is the section of the cellular network mainly directed to manage the signaling information traffic, while the U-plane is the section of the cellular network that is mainly directed to manage the user information traffic.

In current cellular networks, signaling information traffic (or simply "signaling traffic") and user information traffic (or simply "user traffic") are usually managed as a single entity. In this case, the separation between the C-plane and the U-plane mainly occurs at logical level only. Each node of these cellular networks, regardless of the size of its corresponding coverage area, is configured to manage—within its coverage area and for each user equipment in said coverage area—both signaling and user traffic. Therefore, signaling information and user information may be transmitted/received by a same network node, for example by exploiting different time and/or frequency resources.

In order to improve the efficiency and the reliability of the cellular networks, studies have been recently carried out to provide network architectures in which the C-plane and the U-plane are decoupled both at logical and physical levels, to allow that signaling traffic travels separated from user traffic. For the sake of brevity, a cellular network of this type will be now on referred to as "decoupled network". An architecture of this type is for example described in H. Ishii et al., "*A novel architecture for LTE-B: C-plane/U-plane split and Phantom Cell Concept*", Globecom 2012 Workshop: International Workshop on Emerging Technologies for LTE-Advanced and Beyond 4G, pages 624-630. The nodes of a decoupled network may belong to a first category, associated to the C-plane, or to a second category, associated to the U-plane.

The nodes of the first category, also referred to as "C-plane nodes"—usually implemented by the macro nodes of the network—are responsible for the C-plane coverage, and are specialized to mainly manage signaling traffic, operating at the low band of the frequency currently used by the known cellular systems (e.g., 800 MHz). The C-plane nodes are configured to guarantee the exchange of signaling information as well as a basic connectivity with the user equipment. By basic connectivity it is intended connections able to allow the exchange of user traffic having certain (limited) Quality of Service (QoS) constraints, expressed in terms of QoS parameters such as bit rate, Bit Error Rate (BER), latency. For example, a C-plane node may be capable of establishing a connection able to allow only a low bit rate exchange of user traffic.

The nodes of the second category, also referred to as "U-plane nodes"—usually implemented by the small nodes of the network—are instead responsible for the U-plane coverage, and are specialized to mainly manage user traffic.

The coverage area size of each C-plane node is in general larger than the coverage area size of each U-plane node. The coverage areas of all the C-plane nodes of the decoupled network cover (with possible overlapping) portions of the territory in which the decoupled network is located. U-plane nodes are located within the coverage area of each C-plane node of the decoupled network, with the coverage areas of said U-plane nodes that cover (with possible overlapping) at least portions of the territory covered in turn by the coverage area of the corresponding C-plane node. From now on, when a user equipment is said to be within the coverage area of a C-plane node, it means that said user equipment is in condition to establish a link to said C-plane node for being under the control of the latter, and is capable of exchanging (mainly) signaling traffic therewith. Similarly, when a user equipment is said to be within the coverage area of a U-plane node, it means that said user equipment is in condition to establish a link to said U-plane node and is capable of exchanging user traffic therewith.

In order to increase the overall capacity of the cellular network, U-plane nodes can be advantageously designed so as to operate at different frequency bands, for example comprising frequency bands much higher than those currently exploited by the known cellular systems (e.g., 60 GHz), allowing the exchange of user traffic with very high bit rates, such as, for example, 10 Gbit/s. Indeed, at high frequencies, there is more availability of spectrum and the communication is able to exploit channels with wide bandwidth, so as to enable transmission at very high bit rates.

The concept of cellular network exploiting different frequency bands (multi-band cellular network) has been already faced in the art.

For example, "*The GSM System for Mobile Communications*", by M. Mouly, M. B. Pautet, 1992, ISBN 2-9507190-0-7, pages 218-223 (section 4.2.2.2) describes the consolidated technique of the "Frequency Hopping" adopted in GSM system. In order to improve performance through the exploitation of both frequency diversity and interference diversity, the carrier frequency used during a communication is varied (with a given periodicity) within a predefined set of carrier frequencies according to a law which is known both on the transmitting and the receiving sides. In this way, potential interferences and fadings are avoided (or at least reduced).

"*Propagation issues for cognitive radio*" by Molish et al., Proceedings of the IEEE, Vol. 97, No. 5, May 2009, pages 787-804, deals with propagation issues related to the concept of cognitive radio. According to the cognitive radio principle, the system is aware of the environment and dynamically adapts its transmission parameters (including the carrier frequency) to it. In order to improve the spectrum usage in a cognitive radio system, the frequency of the carrier is varied. For example, a secondary user can exploit temporary unused carriers licensed to a primary user. Then the secondary user can change its carriers depending on the free spectrum discovered in real time through spectrum sensing processes or through database accessing.

"*Measurement-Based Band Allocation in Multiband CDMA*", by Lachlan L. H., IEEE Transactions on Wireless Communications, Vol. 4, No. 2, March 2005, describes an approach for the allocation of calls to different available bands in a CDMA system on the basis of path gain measurements or distances.

U.S. Pat. No. 6,954,645 discloses a system and method for channel allocation in a multi-band wireless network to reduce the call blocking probability and the call handover rate of mobile stations. The system includes microcell base stations, at least one macrocell base station, a mobile station, and a channel allocation center. When the mobile station makes/receives a call or executes a handover, the channel allocation center uses a repacking on demand (RoD) scheme to allocate a radio channel of either a macrocell base station or a microcell base station to the mobile station. RoD has the following steps. First, a microcell channel is trying to be allocated if available. If no microcell channel is available, a macrocell channel is then trying to be allocated. Third, if no macrocell channel is available, repacking is performed to execute a handover of another mobile station's call from the macrocell to another microcell, and to allocate a reclaimed macrocell channel to the mobile station. Otherwise, no repacking call is available and the mobile station is blocked or forced terminated.

US 2012/0321005 discloses a way to realize quick adaptation to a communication link between a transmitter and a receiver by using two different frequency carriers. A receiver detects a preamble from a transmission bit string. When determining that a total sum of the number of modified bits exceeds a certain threshold in a range of a payload following the preamble (when detecting that a reception state of a communication link has been degraded), the receiver issues, to a transmitter, a request for changing a transmission parameter (four parameters may be used for enhancement/lowering) for the transmission bit string by using a communication link, which is a relatively-low-frequency carrier. On the other hand, the transmitter receives the request for change, and executes the request for changing the transmission parameter for the transmission bit string while maintaining transmission of a payload in the transmission bit string.

US 2014/0064227 discloses a system, apparatus and method for multiband wireless communication. Frequency bands and/or transmission formats are identified as available within a range for wireless communication. The system evaluates signal quality metrics for each frequency band and selects a communication method based on the evaluation. Multiple frequency bands and communication methods can be utilized by the system such that a combination of licensed, unlicensed, semilicensed, and overlapped frequency bands can be simultaneously used for communication. The system monitors communications and can report link performance for adaptive control of the selected communication method.

WO 2012/166975 discloses a hybrid user equipment and small-node device data offloading architecture. In this hybrid architecture, the small-node device includes a backhaul link to a telecommunication network and/or the Internet. The user equipment can send and receive data through the small-node device using the backhaul link. In accordance with an aspect of the disclosure, a small-node device for offloading data traffic in a cellular telecommunications system is provided that includes: a-macro-base-station-to-the-small-node-device (BS2D) communication section configured to receive a first control-plane message from a base station over a BS2D communication link; a user-equipment-to-the-small-node-device (D2UE) communication section configured to transmit user-plane data to a user equipment over a wireless D2UE communication link established responsive to the first control-plane message; and a backhaul communication section configured to receive the user-plane traffic data from a network server over a backhaul link.

U.S. Pat. No. 8,755,407 discloses a new set of radio link protocols (RLPs) configured to provide for efficient data transmission in a multi-link communication system. In an embodiment, an upper-layer packet is segmented into link-layer packets to be transmitted over a plurality of communication links, each including a first sequence number in accordance with a predetermined order. A second sequence number is further added to each link-layer packet to be transmitted for the first time. The second sequence number is configured to be in a sequence space associated with a particular communication link, and may be used for detection of missing packets.

SUMMARY OF THE INVENTION

The Applicant has recognized that none of the abovementioned prior art documents deals with the problem of how managing the frequencies in a multi band decoupled network. The Applicant has recognized that none of the abovementioned prior art documents are able to efficiently and/or dynamically manage the allocation of frequency bands to the U-plane nodes of a multi band decoupled network when a new or an on-going service involving user traffic exchange between such U-plane node and a user equipment requests a bit rate variation, such as a bit rate increasing.

In view of the above, the Applicant has tackled the problem of providing a multi band network with the capability of efficiently and dynamically managing the allocation of frequency bands to the U-plane nodes.

An aspect of the present invention provides for a cellular network comprising a plurality of control plane transceiver stations, each one configured to provide radio coverage over a corresponding first coverage area for allowing user equipment within said first coverage area to exchange signaling traffic with the control plane transceiver station.

For each control plane transceiver station, the cellular network further comprises one or more user transceiver stations located within said first coverage area. Each user transceiver station is configured to provide radio coverage over a corresponding second coverage area for allowing user equipment within said second coverage area to exchange user traffic with the user transceiver stations by exploiting a selected frequency band among a respective set of frequency bands.

When a user equipment within one first coverage area of said first coverage areas requests to exchange user traffic, the cellular network is configured to:

select a group of candidate user transceiver stations located within said one first coverage area based on the position of the user equipment within said one first coverage area;

select a group of candidate frequency bands among the sets of frequency bands of the user transceiver stations located within said one first coverage area based on at least one among: request parameters indicative of the type of request, user parameters indicative of a user category, and user equipment parameters indicative of a user equipment category, and     allow the user equipment to exchange user traffic with one or more selected user transceiver stations exploiting a selected frequency band based on a mapping between the selected group of candidate transceiver stations and the selected group of candidate frequency bands.

According to an embodiment of the present invention, each control plane transceiver station is further configured to provide radio coverage over its corresponding first coverage area for allowing user equipment within said first coverage area to exchange user traffic with the control plane transceiver station when said request to exchange user traffic involves a Quality of Service compatible with Quality of Service constraints of said control plane transceiver station.

According to an embodiment of the present invention, each control plane transceiver station is further configured to provide radio coverage over its corresponding first coverage area for allowing user equipment within said first coverage area to exchange user traffic with the control plane transceiver station if said request to exchange user traffic involves a Quality of Service that is not compatible with the Quality of Service constraints of said control plane transceiver station and at the same time it is not possible to establish a link with any user transceiver station.

According to an embodiment of the present invention, said Quality of Service constraints of said control plane transceiver station comprise at least one among:

maximum user rate bit rate said control plane transceiver station is able to manage;

minimum user traffic bit error rate said control plane transceiver station is able to manage;

minimum user traffic latency said control plane transceiver station is able to manage.

According to an embodiment of the present invention, the cellular network is configured to select the group of candidate user transceiver stations located within said one first coverage area based on electromagnetic proximity of the user transceiver stations to the user equipment in terms of minimal path loss.

According to an embodiment of the present invention, the cellular network is further configured to order the candidate frequency bands of the selected group in an ordered sequence according to at least one among said request parameters indicative of the type of request, said user parameters indicative of a user category, and said user equipment parameters indicative of a user equipment category, said selected frequency band exploited for allowing the user equipment to exchange user traffic with one or more selected user transceiver stations being selected by the cellular network based on said ordered sequence of candidate frequency bands.

According to an embodiment of the present invention, said request parameters indicative of the type of request comprise at least one among:

a Quality of Service, a type of traffic/service, and amount of data to be transferred involved by the request by the user equipment.

According to an embodiment of the present invention, said user parameters indicative of a user category comprise a user subscriber profile of the user.

According to an embodiment of the present invention, the cellular network is further configured to remove from the ordered sequence of candidate frequency bands first candidate frequency bands based on a statistical analysis of previous usage performances of said first candidate frequency bands.

According to an embodiment of the present invention, said mapping specifies for each candidate frequency band and for each candidate user transceiver stations located within said one first coverage area whether said candidate user transceiver station is actually able to exploit said candidate frequency band or not.

According to an embodiment of the present invention, the cellular network is configured to carry out said mapping based on at least one among:

candidate user transceiver stations capabilities in terms of frequency bands that can be actually used;

candidate user transceiver stations evaluation of available resource in terms of computing power, radio resources or backhauling;

candidate user transceiver stations capabilities in terms of radio chains;

candidate user transceiver stations capabilities in terms of inter-frequency switching time;

electromagnetic emission constraints.

According to an embodiment of the present invention, the cellular network is further configured to carry out said mapping based on at least one among:

energy saving purposes;

guidelines for management of multiple user equipment connected to a same candidate user transceiver station.

According to an embodiment of the present invention, the cellular network is further configured to carry out said mapping in such a way that every candidate frequency band of the group of candidate frequency bands has at least one corresponding candidate user transceiver station that is able to transmit on such candidate frequency band.

According to an embodiment of the present invention, the cellular network is further configured to:

periodically check the Quality of Service of an allowed user traffic exchange between the user equipment and one or more user transceiver stations;

conditioned to said periodical check, select new one or more user transceiver stations for the user traffic exchange.

Another aspect of the present invention provides, in a cellular network comprising a plurality of control plane transceiver stations, each one configured to provide radio coverage over a corresponding first coverage area for allowing user equipment within said first coverage area to exchange signaling traffic with the control plane transceiver station, wherein for each control plane transceiver station, the cellular network further comprises one or more user transceiver stations located within said first coverage area, each user transceiver station being configured to provide radio coverage over a corresponding second coverage area for allowing user equipment within said second coverage area to exchange user traffic with the user transceiver stations by exploiting a selected frequency band among a respective set of frequency bands, a method, comprising the following phases when a user equipment within one first coverage area of said first coverage areas requests to exchange user traffic:

selecting a group of candidate user transceiver stations located within said one first coverage area based on the position of the user equipment within said one first coverage area;

selecting a group of candidate frequency bands among the sets of frequency bands of the user transceiver stations located within said one first coverage area based on at least one among: request parameters indicative of the type of request, user parameters indicative of a user category, and user equipment parameters indicative of a user equipment category, and allowing the user equipment to exchange user traffic with one or more selected user transceiver stations exploiting a selected frequency band based on a mapping between the selected group of candidate transceiver stations and the selected group of candidate frequency bands.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein.

DETAILED DESCRIPTION OF PREFERRED EMBODIMENTS OF THE INVENTION

Figure 1:
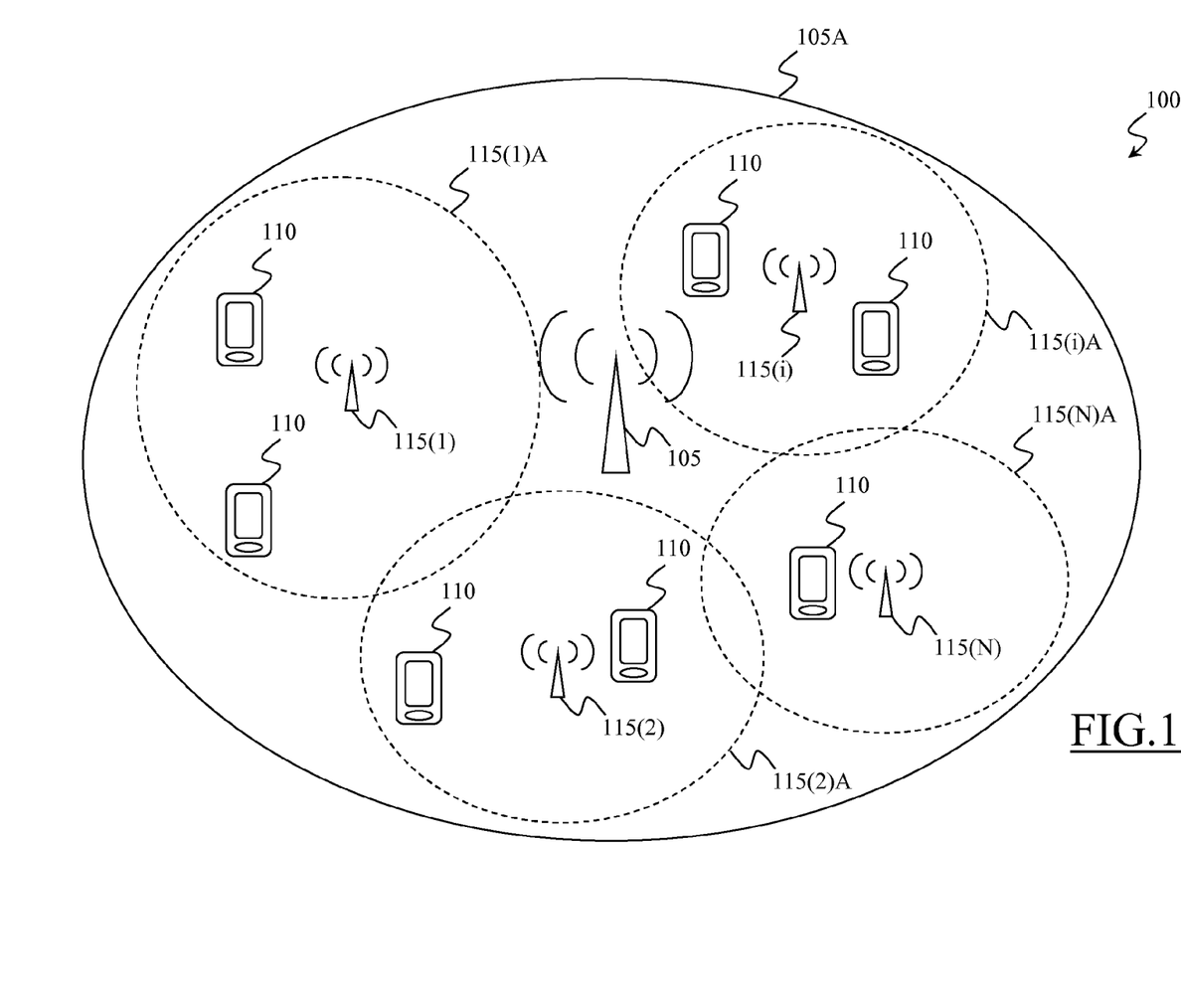
FIG. 1 schematically shows a decoupled network wherein the concepts according to embodiments of the invention can be applied.

With reference to the drawings, a decoupled network 100 wherein the concepts according to embodiments of the invention can be applied is schematically illustrated in FIG. 1. The decoupled network 100 comprises a plurality (only one depicted in the figure) of wide coverage transceiver stations, referred to as C-plane nodes 105. Each C-plane node 105 is configured to provide radio coverage over a relatively wide geographic area, referred to as coverage area 105A, for allowing user equipment 110 (e.g., mobile phones) within the coverage area 105A to exchange signaling traffic with the C-plane node 105. Although not illustrated in the figures, each C-plane node 105 may comprise a set of (e.g., three) antennas, each one configured to provide radio coverage over a portion—referred to as sector—of the coverage area 105A. Each C-plane node 105 is further provided with basic user traffic exchange capabilities, i.e., it is configured to allow user equipment 110 within the coverage area 105A to exchange also user traffic with the C-plane node 105 with (limited) QoS constraints, such as for example:

low bit rates, lower than a corresponding C-plane node maximum user traffic bit rate threshold, high BER (Bit Error Rate), higher than a corresponding C-plane node minimum user traffic BER threshold, and/or high latency, higher than a corresponding C-plane node minimum user traffic latency threshold.

As depicted in the figure, the decoupled network 100 also comprises a number N of smaller coverage transceiver stations, referred to as U-plane nodes $115(i)$ (i=1,2, ... N) located within the coverage area 105A of each C-plane node 105. Each U-plane node $115(i)$ is typically configured to provide radio coverage over a relatively small geographic area, referred to as coverage area $115(i)A$, for allowing user equipment 110 within the coverage area $115(i)A$ to exchange user traffic with the U-plane node $115(i)$. The coverage areas $115(i)A$ of said U-plane nodes $115(i)$ can cover (with possible overlapping) at least portions of the geographic area covered in turn by the coverage area 105A of the corresponding C-plane node 105.

According to an embodiment of the present invention, each U-plane node $115(i)$ is capable of establishing a link to user equipment 110 by exploiting a respective set FBS(i) of frequency bands FB for exchanging user traffic therewith.

If a U-plane node $115(i)$ is additionally equipped with selectively operable software and/or hardware resources capable of managing different frequency bands FB, the set FBS(i) of frequency bands FB corresponding to said U-plane node $115(i)$ may comprise a plurality of switchable different frequency bands FB. In this case, the coverage area $115(i)A$ of the node may change based on the selected frequency band FB.

If instead a U-plane node $115(i)$ is a standard node equipped with standard software and/or hardware resources capable of managing a single frequency band FB, the set FBS(i) of frequency bands FB corresponding to said U-plane node $115(i)$ only comprises said single frequency band FB.

Each C-plane node 105 is configured to carry out in its corresponding coverage area 105A several signaling functions, such as beacon signal transmission, common signaling management, mobility management, and routing of the user traffic toward the U-plane nodes $115(i)$ located within its coverage area 105A. Each C-plane node 105 is also configured to route user traffic to the most suitable U-plane node $115(i)$ among those in its coverage area 105A to optimize user experience. Additionally, each C-plane node 105 is configured to manage the signaling traffic pertaining to the user equipment 110 within its coverage area 105A, independently of the technology used by the U-plane nodes $115(i)$ to exchange user traffic data. Signaling traffic pertaining to a moving user equipment 110 whose location is crossing the border of the coverage area 105A of a C-plane node 105 is exchanged with an adjacent C-plane node 105 through procedures similar to those of a traditional handover, in this case limited to the signaling traffic. The new C-plane node 105 will then route the user traffic to the most suitable U-plane nodes $115(i)$ among those within its coverage area 105A to optimize user experience. As already mentioned above, each C-plane node 105 is further configured to exchange user traffic with (limited) QoS constraints, e.g., at very low bit rates, with user equipment 110 in its corresponding coverage area 105A.

Each U-plane node 115(i) is configured to handle in uplink and in downlink the user traffic generated by the user equipment 110 within its coverage area 115(i)A by exploiting a respective set FBS(i) of frequency bands FB. Additionally, each U-plane node 115(i) may be able to perform very limited signaling functions, such as for example the ones relating to the power management, the sustenance of the traffic link with the user equipments 110, and/or the acknowledge of messages associated with retransmissions.

The abovementioned decoupled network 100 is a two-level network, with a first level comprising nodes directed to mainly carry out C-plane signaling traffic transmission (i.e., the C-plane nodes 105), and a second level comprising nodes directed to mainly carry out U-plane user traffic transmission (i.e., the U-plane nodes 115(i)). However, similar considerations apply if the decoupled network 100 comprises more than two levels, for example a first level comprising wide coverage area nodes directed to carry out C-plane signaling traffic transmission, a second level comprising medium coverage area nodes directed to carry out U-plane user traffic transmission, and a third level comprising small coverage area nodes directed to carry out U-plane user traffic transmission.

Figure 2:
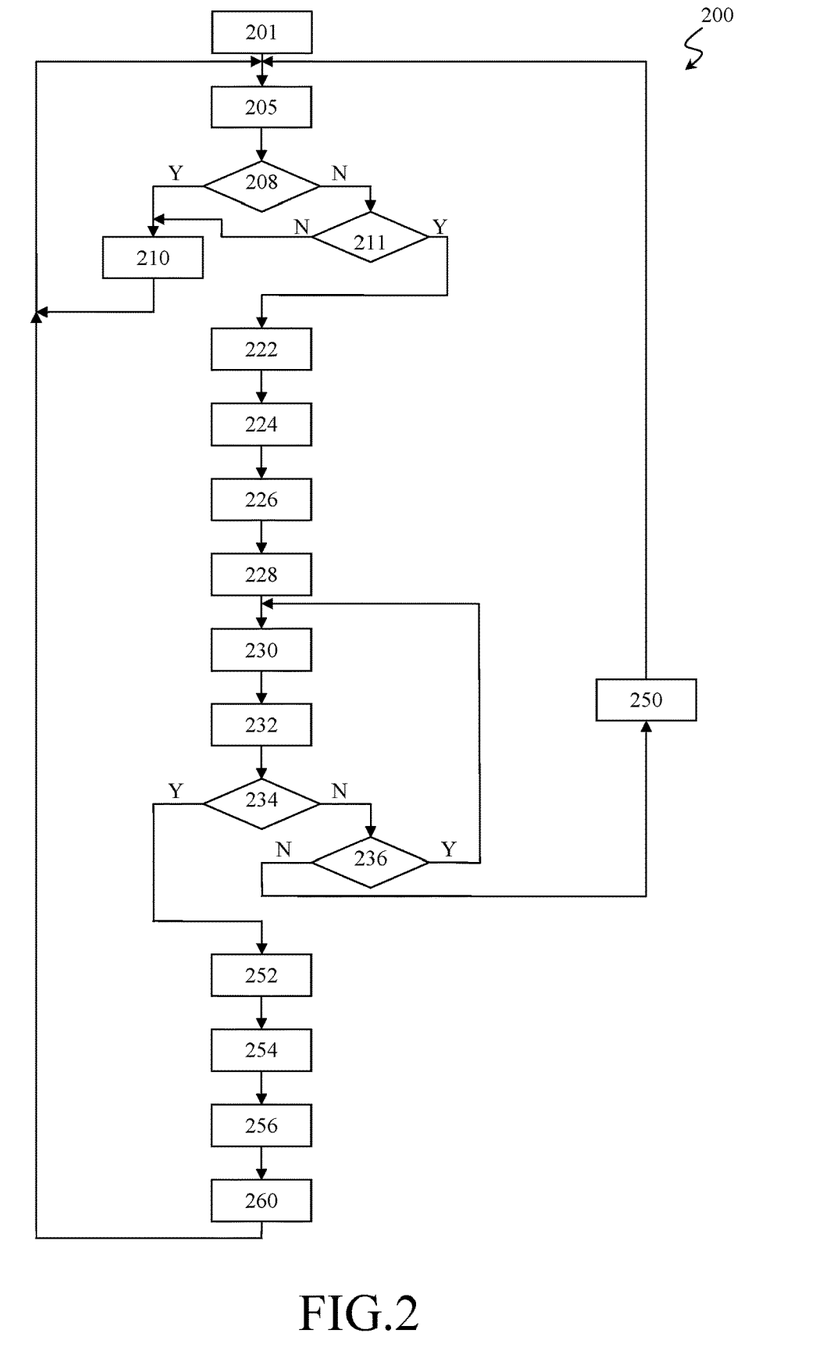
FIG. 2 is a flowchart of the main phases of a procedure for managing the allocation of frequency bands in the network of FIG. 1 according to an embodiment of the present invention.

FIG. 2 is a flowchart of the main phases of a procedure 200 for managing the allocation of frequency bands FB in the decoupled network 100 of FIG. 1 according to an embodiment of the present invention. The procedure 200 is carried out by exploiting hardware and software resources, making use of a set of functionalities, data, program instructions, which resources are mainly located in the C-plane nodes 105 and/or centralized in a control unit of the decoupled network 100, such as the O&M (Operation and Maintenance) system.

The first phase of the procedure 200 according to an embodiment of the present invention (block 201), provides for a user equipment 110 that is camped on the coverage area 105A of a C-plane node 105. The user equipment 110 may be in idle state (i.e., just switched on and registered to the decoupled network 100), or also with a link already established with the C-plane node 105 and/or with a link already established with a U-plane node 115(1) comprised within the coverage area 105A of said C-plane node 105.

The next phase of the procedure 200 (block 205) occurs when the user equipment 110 requests a new link following the request of a new service, or when the user equipment 110 requests to increase the QoS of a service running on an already established link. Such request may be directly triggered by the user of the user equipment 110 or by machine intervention.

At this point, a check is made to assess whether the C-plane node 105 whose coverage area 105A has said user equipment 110 within it is capable of serving the request or not (block 208). Said check is autonomously made by the C-plane node 105 itself.

If the C-plane node 105 is capable of serving the request made by the user equipment 110 (exit branch Y of block 208), i.e., because the requested QoS is compatible with the QoS constraints of said C-plane node 105, e.g., because the following conditions (or a subset thereof) are verified:
the bit rate demanded by such request is lower than the corresponding C-plane node maximum user traffic bit rate threshold,
the BER tolerated by such request is higher than the corresponding C-plane node minimum user traffic BER threshold,
the latency tolerated by such request is higher than the corresponding C-plane node minimum user traffic latency threshold,
the user equipment 110 is directly served by the C-plane node 105, with the user equipment 110 and the C-plane node 105 that establish a link for exchanging user traffic (block 210, then returning to block 205) using a setup procedure distinctive of a decoupled network (see for example pages 14-15 of International Patent Application WO 2012/166975).

If the C-plane node 105 is not capable of serving the request made by the user equipment 110 (exit branch N of block 208), i.e., because the requested QoS is not compatible with the QoS constraints of said C-plane node 105, e.g., because at least one among the following conditions is verified:
the bit rate demanded by such request is higher than the corresponding C-plane node maximum user traffic bit rate threshold,
the BER tolerated by such request is lower than the corresponding C-plane node minimum user traffic BER threshold,
the latency tolerated by such request is lower than the corresponding C-plane node minimum user traffic latency threshold,
a verification is carried out to check whether it is possible to activate one or more links via U-plane node(s) 115(i) (block 211). For example, said verification may include a check as to whether the user equipment 110 is static or moving with a speed below a certain threshold, or may include a check of the capability of the user equipment 110 itself. If it is not possible to establish a link with a U-plane node 115(i) (exit branch N of block 211), a minimal link is guaranteed by the C-plane node 105 compatible with the QoS constraints (returning back to block 210). Otherwise, if there exist one or more U-plane node(s) 115(i) that are capable to establish said one or more links (exit branch Y of block 211), the procedure 200 continues as will be described in the following according to an embodiment of the present invention.

According to an embodiment of the present invention, the procedure 200 provides for discovering the position of the user equipment 110 within the coverage area 105A in order to obtain a list UL of candidate U-plane nodes 115(i) in the vicinity by exploiting electromagnetic proximity of the U-plane nodes 115(i) to the user equipment 110 in terms of minimal path loss (block 222). Localization and discovery mechanism are currently of interest for standard setting in the 3GPP (Release 12) within the study item "*Small cell enhancements for E-UTRA and E-UTRAN*" (Technical Report 3GPP TR 36.872 paragraph 6.2). For instance, efficient use of current or modified Synchronization Signals or Reference Signals can be considered, possibly in conjunction with other mechanisms based on the transmission of pilot uplink signals by the user equipment 110 listened by the U-plane nodes 115(i) to detect proximity of active user equipment 110. Therefore, the resulting list UL of candidate U-plane nodes 115(i) generated in this way depends on the position of the user equipment 110 within the coverage area 105A. Such phase is autonomously carried out by the C-plane node 105 itself.

According to an embodiment of the present invention, the next phase of the procedure 200 (block 224) provides for generating an ordered list FBL of candidate frequency bands FB that can be used to satisfy the request made by the user equipment 110. The frequency bands FB are ordered according to an ordered sequence from the most desirable frequency band FB to the least preferable one based on request parameters indicative of the type of request and/or based on user parameters indicative of the category of user which made the request and/or based on user equipment parameters indicative of the category of the user equipment used by the user to make the request. To obtain the above mentioned ranking a set of criteria may be applied. The analysis could be guided by specific Network operator policies regarding the general usage of the different available frequency bands FB. As a not limitative example, such request parameters may comprise at least one among QoS (for example in terms of at least one among bit rate, BER, and latency), type of traffic/service (real time, not real time), total amount of data to be transferred (when available), such user parameters may comprise user subscriber profile, grouped in a number of user categories (e.g., premium users having high priority, standard users having standard priority, and so on), and such user equipment parameters may comprise the specific category of the user equipment (e.g., smartphone, tablet, and so on). For instance, a wideband channel in the 60 GHz band allowing a peak rate of 10 Gbit/s would not be ideal for an audio streaming service (with its real time usage of a little portion of the available band) but perfectly fitting for fast downloads of HD movies. Moreover, as a further example, a high priority user could be entitled to a data link with guaranteed bit rate and high throughput calling for a frequency band with a wider channel than a channel in a frequency band used by a lower priority user. Said phase is carried out by the C-plane node 105 using, if necessary, the decoupled network 100 O&M or core network nodes databases.

According to an embodiment of the present invention, the following phase of the procedure 200 (block 226) provides for an optional filtering of the ordered list FBL of frequency bands FB generated in the previous phase (block 224). Such optional filtering provides for removing from the list FBL one (or more) specific frequency bands FB based on a statistical analysis of previous usages performance of such frequency bands FB in the area where the link should be set up. Said statistical analysis may exploit a Knowledge Base system to trace the performance of the different frequency bands FB in the different geographical areas. As an example, the area of the analysis could be assumed as wide as the coverage area 105A of the C-plane node 105 so as to allow a distributed architecture where information about previous usage performance is stored and managed locally in each C-plane node 105 with (possibly) a central backup storage, for example in the O&M system. This Knowledge Base system is able to help to single out potential underperformance on some frequency bands FB due, as an example in the millimeter wave ranges, to severe weather conditions or to local and transitory occurrence of too many obstacles for the transmission (i.e., large gathering of people as pointed out in "*System Level Performance of Millimeter-wave Access Link for Outdoor Coverage*" by M. Abouelseoud, G. Charlton, IEEE Wireless Communications and Networking Conference (WCNC) 2013, pages 4146-4151). Said phase is carried out by the C-plane node 105.

According to an embodiment of the present invention, once a set of candidate U-plane nodes 115(i) (listed in the list UL) and a set of candidate frequency bands FB (listed in the (optionally filtered) list FBL) have been generated, the C-plane node 105, using, if necessary, the decoupled network 100 O&M, or core network nodes databases, carries out a mapping between such candidate U-plane nodes 115(i) and candidate frequency bands FB in order to specify for each frequency band FB and for each U-plane node 115(i) whether the U-plane node 115(i) is actually able to exploit such frequency band FB or not (block 228). The frequency bands FB of the list FBL that can be exploited by at least one of the U-plane nodes 115(i) listed in the list UL according to the mapping, are listed in a further ordered list FBLAM, following the same order of the list FBL (if each one of the frequency bands FB of the list FBL is mapped to at least one corresponding U-plane node 115(i), the list FBLAM coincides with the list FBL).

According to an embodiment of the present invention, such mapping derives from a set of constraints and operator policies. As a not limitative example, the following constraints can be mentioned:

Candidate U-plane node 115(i) capabilities in terms of the frequency bands FB that can be actually used, obtained by checking the set FBS(i) of frequency bands FB that the U-plane node 115(i) is configured to exploit;

Candidate U-plane node 115(i) capabilities in terms of capacity (in the event that other user equipment 110 were already connected to the U-plane node 115(i), a careful evaluation of the available resources should be performed in terms of computing power, radio resources, backhauling, etc.)

Candidate U-plane node 115(i) capabilities in terms of radio chains (i.e., the U-plane node 115(i) could be a multi-frequency node having a set FBS(i) of frequency bands FB comprising more than one frequency band FB but equipped with only one radio chain so that it is able to exploit only one frequency band FB at a time; alternatively the U-plane node 115(i) could be equipped with few radio chains already used by other user equipment 110);

Candidate U-plane node 115(i) capabilities in terms of inter-frequency switching time (i.e., the switching time between frequency bands FB could be deemed not compatible with or suitable for the requested service, considering the existence of other user equipment 110 on other frequency bands FB);

Electromagnetic emission constraints (for example, in a multiple radio chain node, constraints to the maximum emitted power may arise due to technical or regulatory concerns).

As a not limitative example, the following operator policies can be listed:

Guidelines for the management of multi-frequency U-plane nodes 115(i) (i.e., to distribute evenly the traffic between the available frequency bands FB and nodes, alternatively, during off-peak hours, the effort to concentrate the connections on U-plane nodes 115(i) (or frequency bands FB) already active so as to keep switched off or in stand-by the other nodes (or portion of them) for energy saving purposes);

Guidelines for the management of multiple user equipment 110 connected to the same U-plane node 115(i). According to the capabilities (resources) of the U-plane node 115(i) different approaches can be envisioned in the management of multiple connections with multiple user equipment 110, each with consequences to be carefully evaluated by the operator. As an example, in a multi-frequency multiple access (when different connections in different frequency bands FB could be active at the same time) the incumbent user equipment 110 (i.e., the user equipment 110 that are connected to the U-plane node of the network 115(i) at a given time) preserve their respective frequency band FB while in a single frequency multiple access (when different user equipment 110 share the same frequency band FB) forced handovers of the incumbent user equipments 110 to a new frequency band FB may be required.

According to an embodiment of the present invention, the mapping between the candidate U-plane nodes 115(i) and the candidate frequency bands FB is carried out in such a way that every frequency band FB in the ordered list FBLAM has at least a corresponding candidate U-plane node 115(i) able to transmit on such frequency band FB.

Based on the mapping between the candidate U-plane nodes 115(i) and candidate frequency bands FB, the C-plane node 105 provides for selecting one or more U-plane nodes 115(i) and drive it/them to transmit a reference signal to the user equipment 110 with a selected frequency band FB among the candidate frequency bands FB the U-plane node 115(i) is actually able to use (block 230) according to the mapping. The selection of the frequency band FB among the candidate frequency bands FB the U-plane node(s) 115(i) is(are) actually able to exploit is carried out taking into account the order in which said candidate frequency bands FB are listed in the list FBLAM.

In the following phase of the procedure according to an embodiment of the present invention (block 232), the user equipment 110 collects radio quality measurements of the reference signal(s) and sends them to the C-plane node 105.

At this point, based on the collected measures, the C-plane node 105, assesses whether the link(s) to be established between the one or more selected U-plane nodes 115(i) and the user equipment 110 by using the selected frequency band FB satisfies/satisfy quality criteria, such as criteria defined by configurable threshold on Radio Signal Strength (RSS) or Signal to Interference plus Noise Ratio (SINR), or not (block 234).

According to an embodiment of the present invention, if none of the link(s) is(are) assessed to satisfy such quality criteria (exit branch N of block 234), the C-plane node 105 checks whether there are other candidate frequency bands FB in the list FBLAM the U-plane node(s) 115(i) is(are) actually able to exploit or not (block 236). In the affirmative case (exit branch Y of block 236), a new frequency band FB is selected, and the one or more U-plane nodes 115(i) are controlled so as to transmit a reference signal with said new selected frequency band FB (returning to block 230). In the negative case (exit branch N of block 236), it means that no one among the candidate frequency bands FB provided by the mapping satisfy the quality criteria, i.e., the decoupled network 100 is not able, at the moment, to satisfy the request of the user equipment 110. In this case, after a waiting time (block 250), the procedure returns back to block 205.

According to an embodiment of the present invention, if there is at least a link that is assessed to satisfy the quality criteria (exit branch Y of block 234), according to an embodiment of the present invention the C-plane node 105 commands the user equipment 110 and the one or more selected U-plane nodes 115(i) to activate the link(s) between the one or more selected U-plane nodes 115(i) and the user equipment 110 by exploiting the selected frequency band FB (block 252). The case in which more than one link has to be activated corresponds to a multi-link traffic connection scenario, providing for a carrier aggregation with two open physical channels (see for example U.S. Pat. No. 8,755,407).

Therefore (block 254), the user equipment 110 and the one or more selected U-plane nodes 115(i) establish the link(s) with the selected frequency band FB by using set-up procedures distinctive of the decoupled network, such as for example the procedure described in section 10.1.2.X.1. of document R2-144660 disclosed during the 3GPP RAN2 Meeting #87-bis, Shanghai, China, 6-10 Oct. 2014 (http://www.3gpp.org/ftp/tsg_ran/WG2_RL2/TSGR2_87bis/Docs/)

Additionally, if called for by a policy, intra-cell inter-frequency handovers of incumbent user equipments 110 already connected to the same U-plane nodes 115(i) are carried out on the selected frequency band FB.

At this point, the user equipment 110 actually uses the established link for making the requested new service available or for making the already running service available with an increased QoS for exchanging user traffic (block 256).

After the service has been made available, the user equipment 110 requests the C-plane node 105 to release the associated radio resources and terminate the link (block 260).

Then, the procedure 200 returns back to block 205, for example when the user equipment 110 requests a new link following the request of a new service.

According to an embodiment of the present invention (not illustrated in figure), the user equipment 110 is configured to periodically check the QoS of the service made available. In the event that the checked QoS degraded, such as for example to an extent such that at least one among the following condition is verified:

the bit rate of the service made available is lower than a corresponding minimum bit rate threshold, the BER of the service made available is higher than a corresponding maximum BER threshold, the signal-to-interference ratio of the service made available is higher than a corresponding maximum signal-to-interference threshold, or in case of a link failure, the user equipment 110 informs the C-plane node 105, about said event occurrence. In this case, the C-plane node 105 traces the occurred event by recording it in the Knowledge Base system for future use in block 226. If the C-plane node 105 deems that a complete re-assessment of the scenario in terms of service request, user equipment 110 status and location, frequency band FB usage, mapping between U-plane nodes 115(i) and frequency bands FB, and measurements of reference signal is required, the procedure 200 returns back to block 205. There are cases in which a complete re-assessment is deemed not required. For example, in case of a stationary user equipment 110, the phase corresponding to block 222 can be skipped, and the procedure 200 returns directly to block 224, or in case of a rapid response when the entire operational context is unchanged, the procedure 200 returns directly to block 230.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

The invention claimed is:

1. A cellular network comprising:
   a plurality of control plane transceiver stations, each one configured to provide radio coverage over a corresponding first coverage area to allow user equipment within said first coverage area to exchange signaling traffic with the control plane transceiver station;
   one or more user transceiver stations for each control plane transceiver station and located within said first coverage area, each user transceiver station being configured to provide radio coverage over a corresponding second coverage area to allow user equipment within said second coverage area to exchange user traffic with the user transceiver stations by exploiting a selected frequency band among a respective set of frequency bands,
   wherein when a user equipment within one first coverage area of said first coverage area requests to exchange user traffic, the cellular network is configured to:
      select a group of candidate user transceiver stations located within said one first coverage area based on a position of the user equipment within said one first coverage area;
      select a group of candidate frequency bands among the sets of frequency bands of the user transceiver stations located within said one first coverage area based on at least one among: request parameters indicative of the type of request, user parameters indicative of a user category, and user equipment parameters indicative of a user equipment category, and
      allow the user equipment to exchange user traffic with one or more selected user transceiver stations exploiting a selected frequency band based on a mapping between the selected group of candidate transceiver stations and the selected group of candidate frequency bands.

2. The cellular network of claim 1, wherein each control plane transceiver station is further configured to provide radio coverage over a corresponding first coverage area to allow user equipment within said first coverage area to exchange user traffic with the control plane transceiver station when said request to exchange user traffic involves a Quality of Service compatible with Quality of Service constraints of said control plane transceiver station.

3. The cellular network of claim 2, wherein said Quality of Service constraints of said control plane transceiver station comprise at least one among:
   maximum user rate bit rate said control plane transceiver station is able to manage;
   minimum user traffic bit error rate said control plane transceiver station is able to manage;
   minimum user traffic latency said control plane transceiver station is able to manage.

4. The cellular network of claim 1, wherein each control plane transceiver station is further configured to provide radio coverage over a corresponding first coverage area to allow user equipment within said first coverage area to exchange user traffic with the control plane transceiver station if said request to exchange user traffic involves a Quality of Service that is not compatible with the Quality of Service constraints of said control plane transceiver station and a link with any user transceiver station cannot be established.

5. The cellular network of claim 1, wherein the cellular network is configured to select the group of candidate user transceiver stations located within said one first coverage area based on electromagnetic proximity of the user transceiver stations to the user equipment in terms of minimal path loss.

6. The cellular network of claim 1, wherein the cellular network is further configured to order the candidate frequency bands of the selected group in an ordered sequence according to at least one among said request parameters indicative of the type of request, said user parameters indicative of a user category, and said user equipment parameters indicative of a user equipment category, said selected frequency band exploited to allow the user equipment to exchange user traffic with one or more selected user transceiver stations being selected by the cellular network based on said ordered sequence of candidate frequency bands.

7. The cellular network of claim 6, wherein the cellular network is further configured to remove from the ordered sequence of candidate frequency bands first candidate frequency bands based on a statistical analysis of previous usage performances of said first candidate frequency bands.

8. The cellular network of claim 1, wherein said request parameters indicative of the type of request comprise at least one among:
   a Quality of Service,
   a type of traffic/service, and
   amount of data to be transferred
   involved by the request by the user equipment.

9. The cellular network of claim 1, wherein said user parameters indicative of a user category comprise a user subscriber profile of the user.

10. The cellular network of claim 1, wherein said mapping specifies for each candidate frequency band and for each candidate user transceiver stations located within said one first coverage area whether said candidate user transceiver station is actually able to exploit said candidate frequency band or not.

11. The cellular network of claim 10, wherein the cellular network is configured to carry out said mapping based on at least one among:
   candidate user transceiver stations capabilities in terms of frequency bands that can be actually used;
   candidate user transceiver stations evaluation of available resource in terms of computing power, radio resources or backhauling;
   candidate user transceiver stations capabilities in terms of radio chains;
   candidate user transceiver stations capabilities in terms of inter-frequency switching time;
   electromagnetic emission constraints.

12. The cellular network of claim 10, wherein the cellular network is further configured to carry out said mapping based on at least one among:
   energy saving purposes;
   guidelines for management of multiple user equipment connected to a same candidate user transceiver station.

13. The cellular network of claim 10, wherein the cellular network is further configured to carry out said mapping in such a way that every candidate frequency band of the group of candidate frequency bands has at least one corresponding candidate user transceiver station that is able to transmit on such candidate frequency band.

14. The cellular network of claim 1, wherein the cellular network is further configured to:

periodically check the Quality of Service of an allowed user traffic exchange between the user equipment and one or more user transceiver stations;

conditioned to said periodical check, select new one or more user transceiver stations for the user traffic exchange.

15. A method for a cellular network comprising a plurality of control plane transceiver stations, each one configured to provide radio coverage over a corresponding first coverage area for allowing user equipment within said first coverage area to exchange signaling traffic with the control plane transceiver station, wherein for each control plane transceiver station, the cellular network further comprises one or more user transceiver stations located within said first coverage area, each user transceiver station being configured to provide radio coverage over a corresponding second coverage area for allowing user equipment within said second coverage area to exchange user traffic with the user transceiver stations by exploiting a selected frequency band among a respective set of frequency bands, the method comprising, when a user equipment within one first coverage area of said first coverage area requests to exchange user traffic:

selecting a group of candidate user transceiver stations located within said one first coverage area based on the position of the user equipment within said one first coverage area;

selecting a group of candidate frequency bands among the sets of frequency bands of the user transceiver stations located within said one first coverage area based on at least one among: request parameters indicative of the type of request, user parameters indicative of a user category, and user equipment parameters indicative of a user equipment category, and allowing the user equipment to exchange user traffic with one or more selected user transceiver stations exploiting a selected frequency band based on a mapping between the selected group of candidate transceiver stations and the selected group of candidate frequency bands.

\* \* \* \* \*